United States Patent [19]
Stone

[11] 3,820,115
[45] June 25, 1974

[54] NAVIGATIONAL RECEIVER FAILURE WARNING SYSTEM

[76] Inventor: Neil Stone, 940 W. Kingston Dr., N.E., Atlanta, Ga. 30342

[22] Filed: Sept. 24, 1971

[21] Appl. No.: 183,419

[52] U.S. Cl.............. 343/107, 343/108 R, 343/106
[51] Int. Cl............................................... G01s 1/08
[58] Field of Search............ 343/106 R, 108 R, 109, 343/17.7; 325/363, 407

[56] References Cited
UNITED STATES PATENTS
| | | | |
|---|---|---|---|
| 2,890,442 | 6/1959 | Glenny et al. | 343/107 |
| 3,323,125 | 5/1967 | Lunn et al. | 343/109 |
| 3,389,392 | 6/1968 | Stauffer et al. | 343/108 R |

Primary Examiner—Maynard R. Wilbur
Assistant Examiner—Theodore Blum
Attorney, Agent, or Firm—Mason, Fenwick and Lawrence

[57] ABSTRACT

A radio receiver for navigational or guidance of aircraft, including a channel of conventional processing circuits for processing the received radio signals to activate a course indicator, circuitry for superimposing rider signals on the received radio signals near the input end of the channel, apparatus for comparing the rider signals after processing through the channel with their original form, and an alarm indicator for indicating selected differences between the compared signals.

12 Claims, 8 Drawing Figures

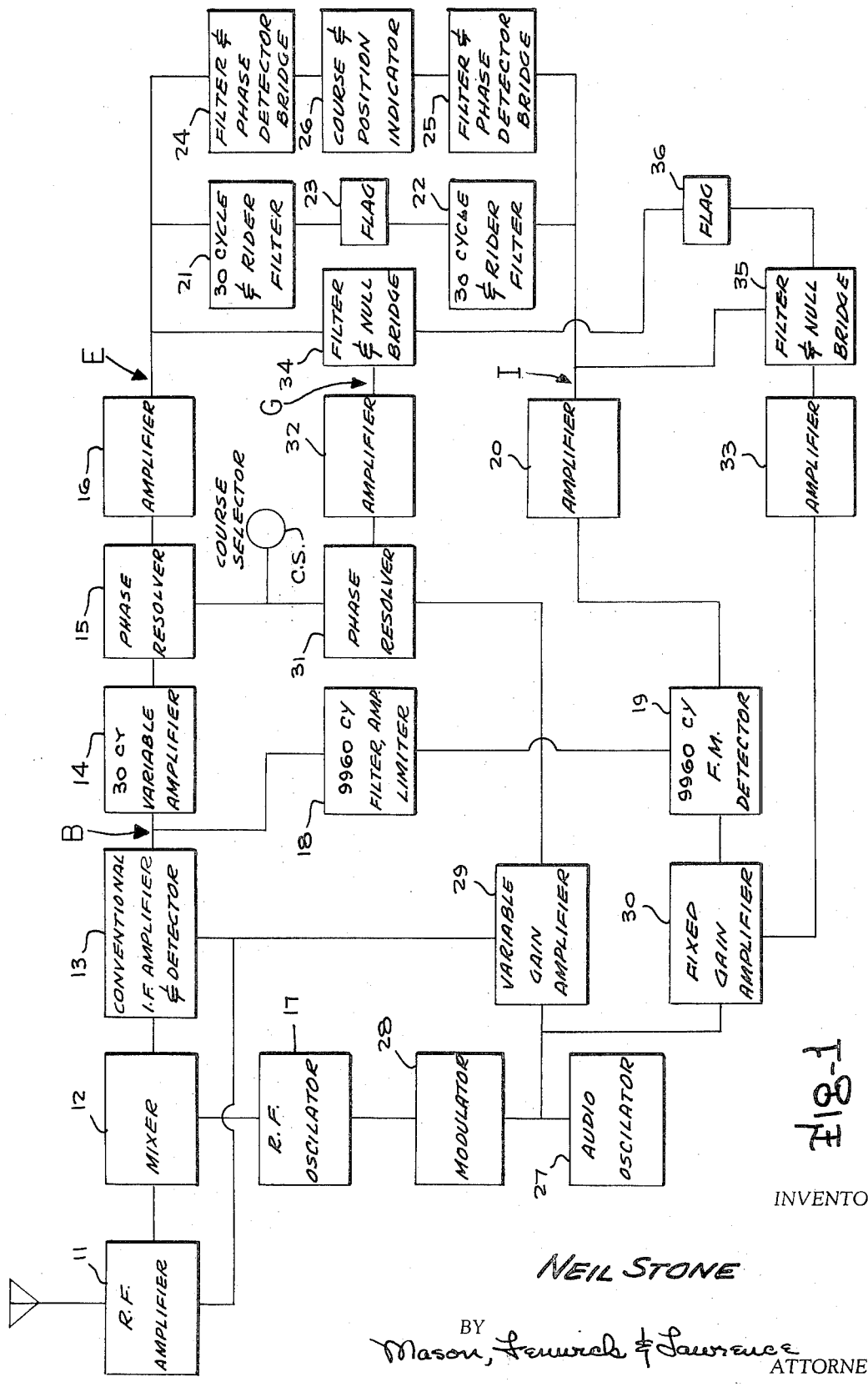

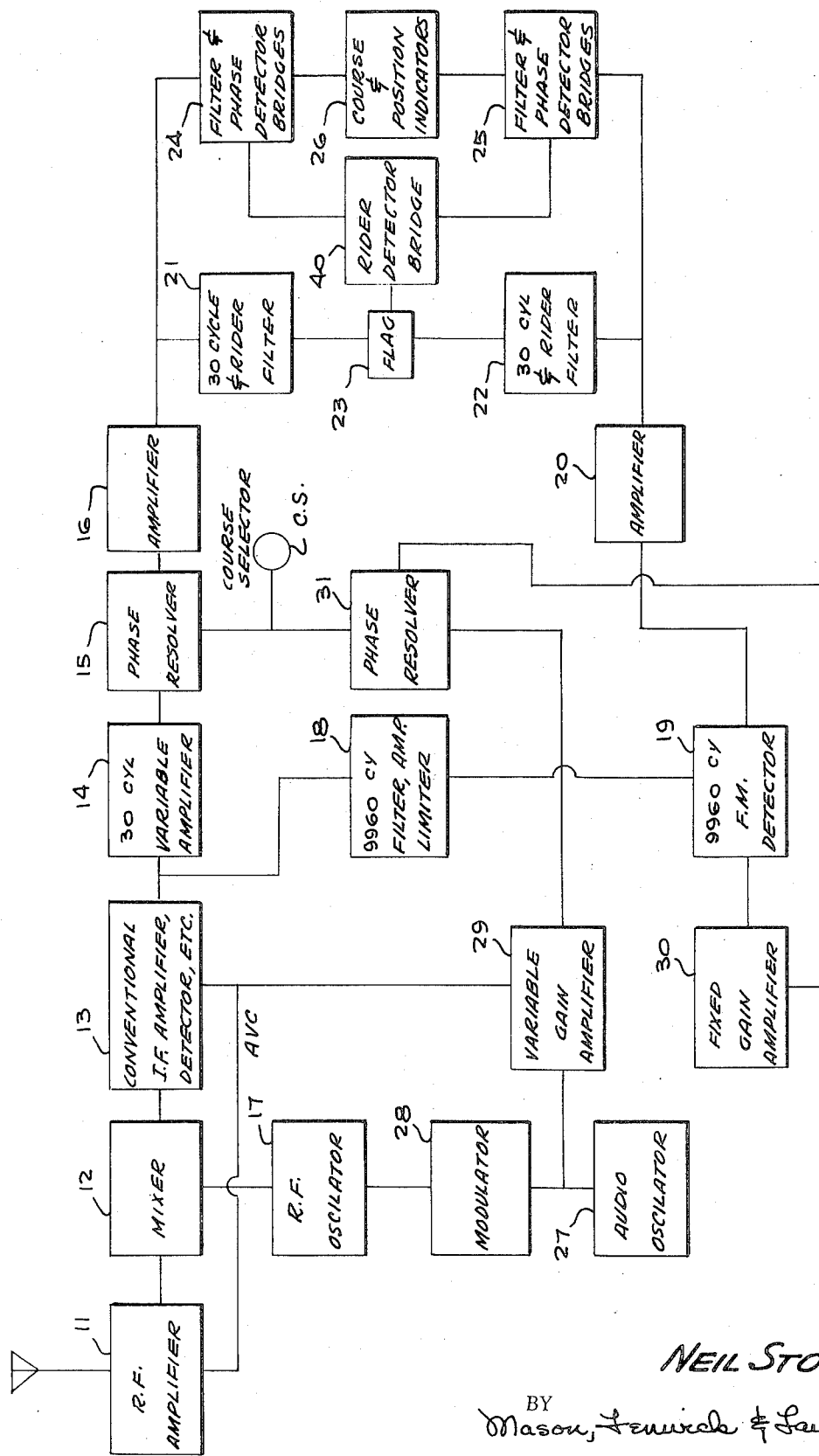

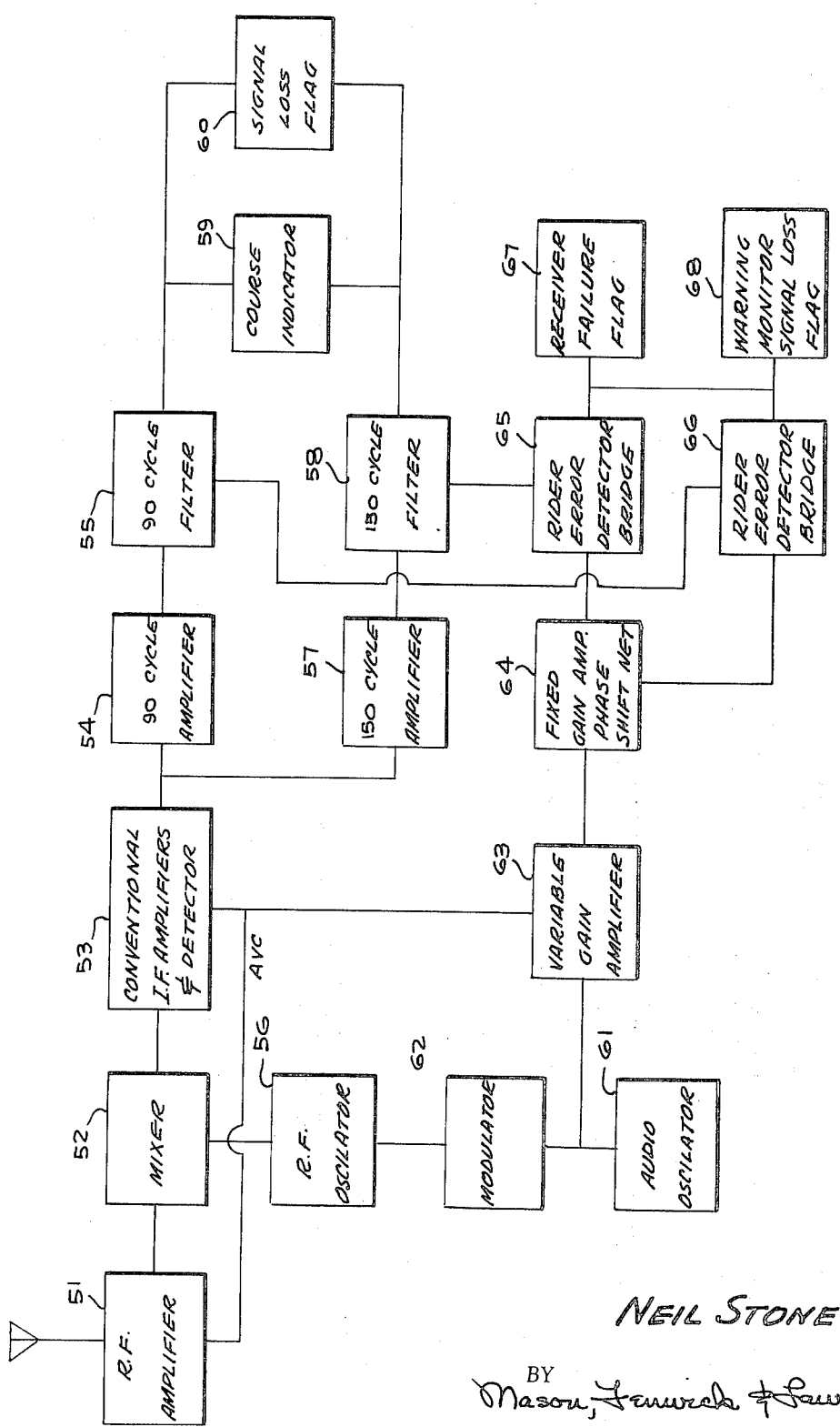

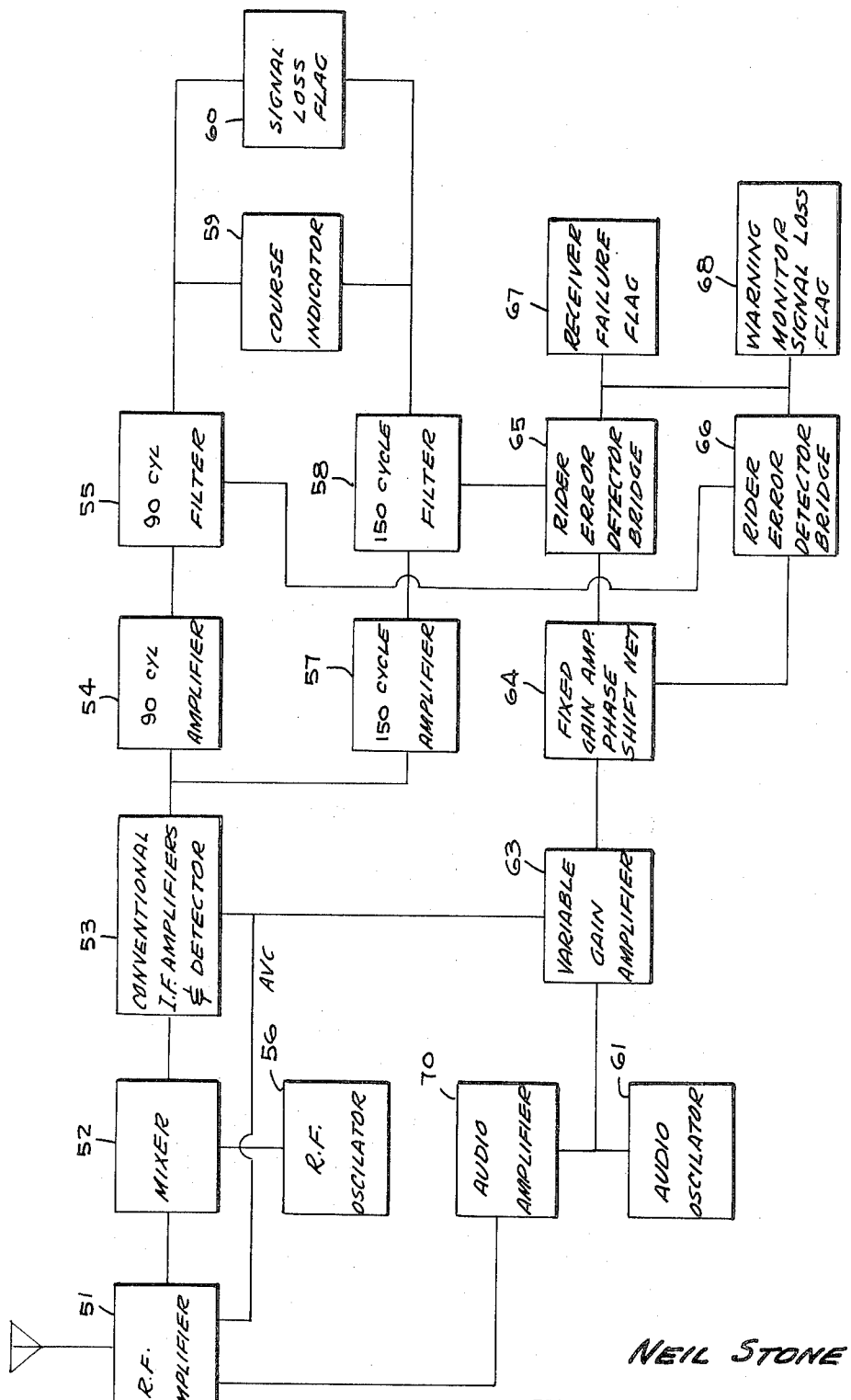

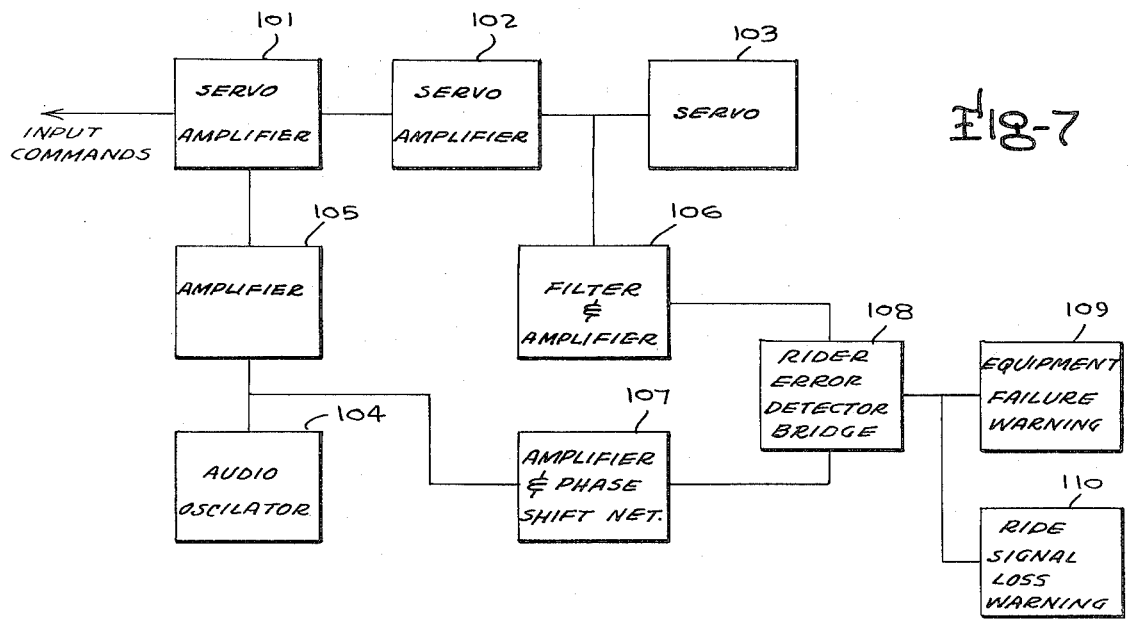
Fig-7
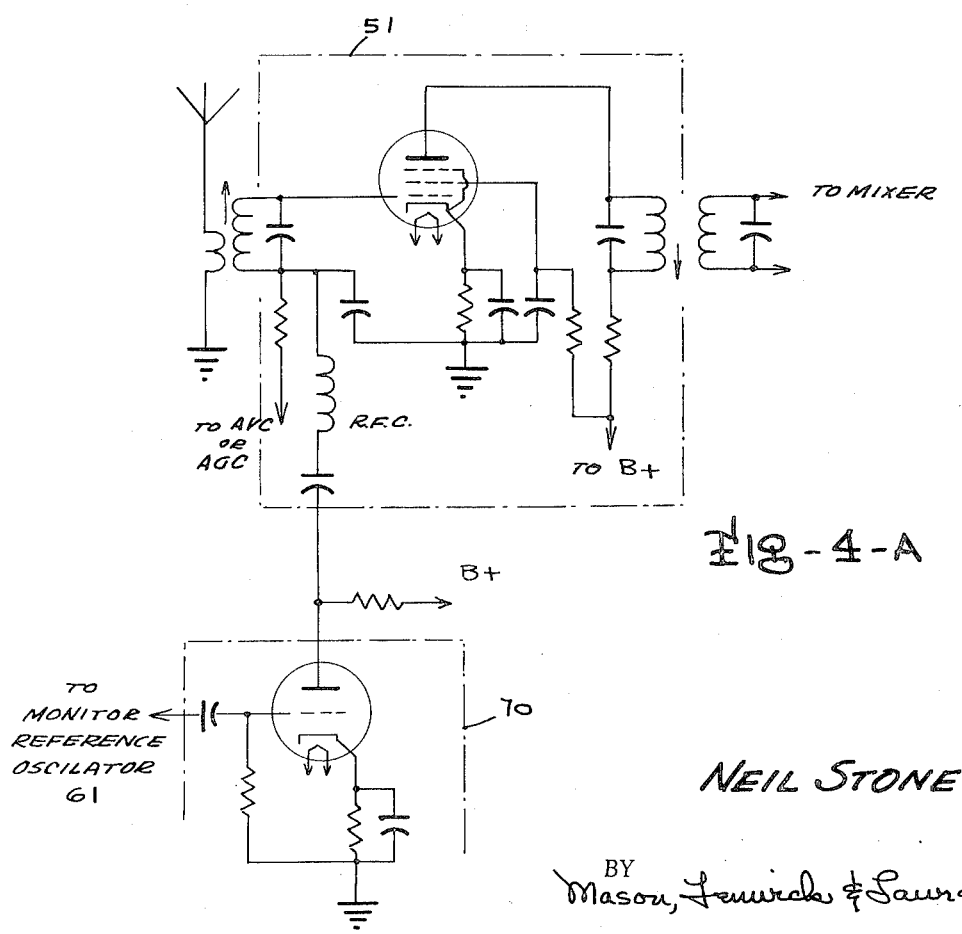
Fig-4-A

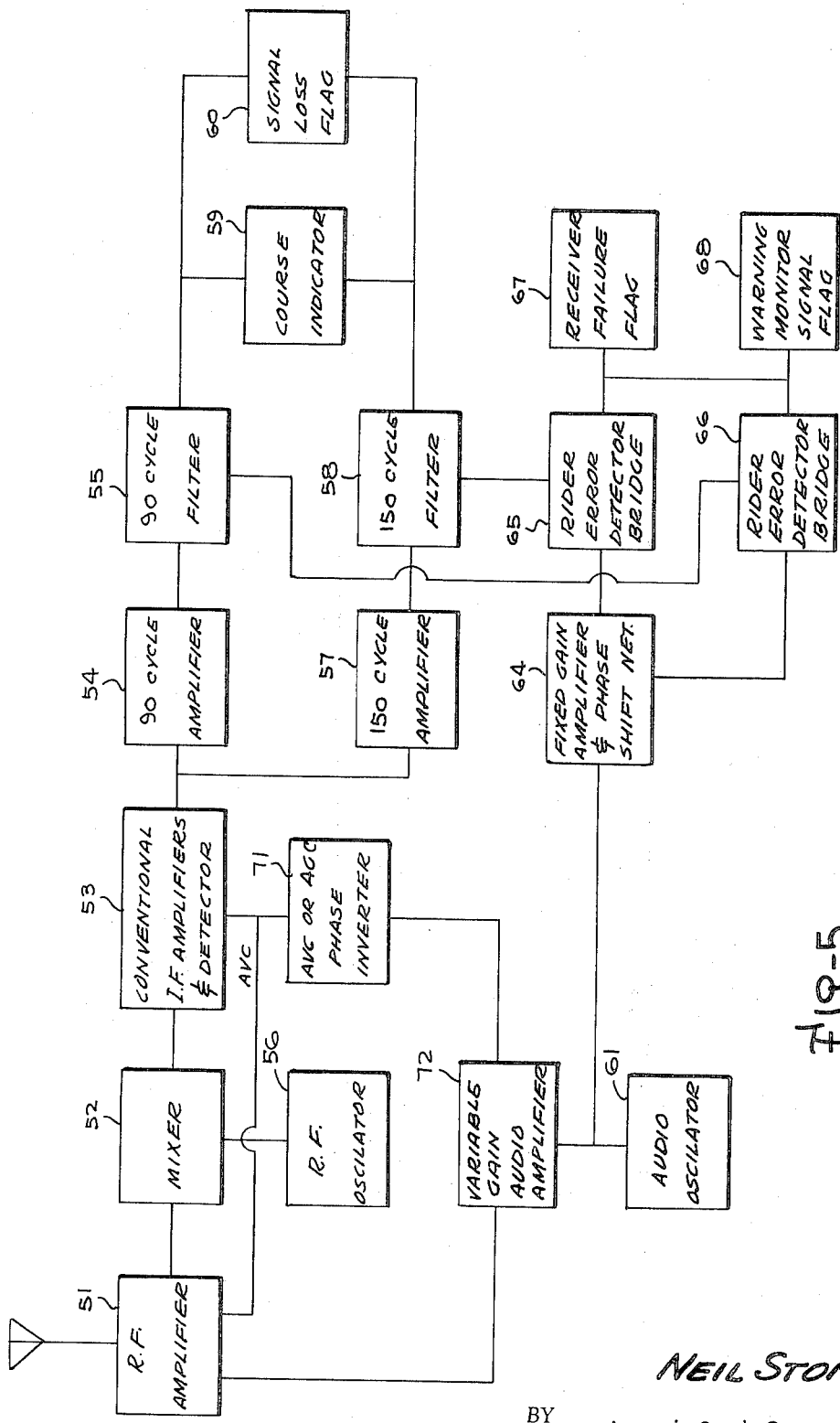

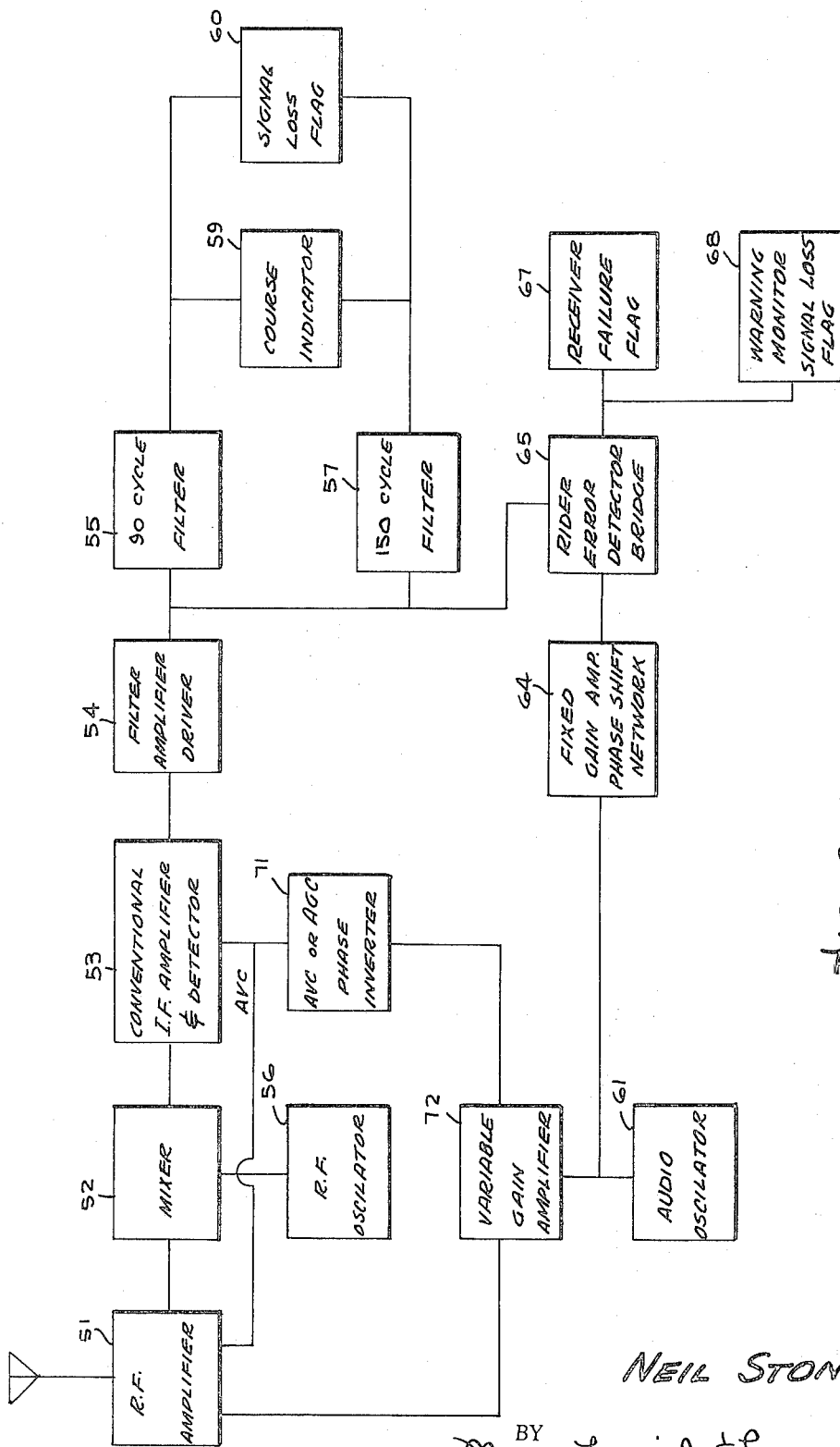

3,820,115

NAVIGATIONAL RECEIVER FAILURE WARNING SYSTEM

BACKGROUND AND OBJECTS OF THE INVENTION

The invention relates to an alarm system for radio navigational receivers, such as omnirange navigation systems and the like, and more particularly to a failure warning system for radio navigational receivers which involves injection of rider signals in the receiver circuitry.

The invention may be applied to VOR navigational receivers, aircraft ILS localizer or glide slope receivers, auto pilot servo amplifiers, or similar equipment, and is designed to operate a flag to warn the operator of an improper operation which might affect the accuracy of the system.

Since the inception of using radio and electronic signals to navigate ships, aircraft or other vehicles from one place to another, there has occurred the persistent problem of providing the operator with warnings of improper operation. Currently, to the best of my knowledge, warning systems presently in use are only able to indicate the loss of a required signal, and are unable to warn of a change in the characteristics of the required signals which might affect their accuracy. For example, earlier U.S. Pat. No. 3,110,028 is representative of the basic type of system currently in use, which can only respond to a loss of signal from one or the other channel, but cannot respond to a change in the characteristics of the signals, such as a phase shift error caused by a minor component failure or a minor failure of a major component where both the entire signals are present and of the desired or greater signal strength.

An object of the present invention is the provision of a novel system for obviating the above described problems by injecting into the radio navigational receiver a rider signal of known characteristics along with the received signal and comparing the rider signal, after it has passed through the receiver, with its original form. Any change in phase, harmonic content, or absolute strength will provide a warning that the receiver is not functioning properly. This would be in addition to the normal means currently employed in failure warning systems for indicating error or failure in the system.

Another object of the present invention is the provision of a novel failure warning system for radio navigational receivers and the like, wherein a rider signal is superimposed on the received signal by modulating one of the local oscillators in the receiver, or by superimposing the rider signal on the received signal at other locations in the receiver, for example by application to the AVC or AGC voltage where it is applied to the R.F. amplifier or I.F. amplifiers.

Other objects, advantages and capabilities of the present invention will become apparent from the following detailed description, taken in conjunction with the accompanying drawings illustrating several preferred embodiments of the invention.

BRIEF DESCRIPTION OF THE FIGURES

FIG. 1 is a block diagram of an aircraft VOR navigational receiver incorporating one embodiment of the means for injecting rider signals to provide a failure warning system in accordance with the present invention;

FIG. 2 is a block diagram of another means of incorporating a rider signal injection components in an aircraft VOR navigational receiver;

FIG. 3 is a block diagram illustrating an arrangement for incorporating the failure warning system of the present invention in an aircraft ILS localizer or glide slope receiver;

FIG. 4 is a block diagram of a system similar to that shown in FIG. 3, but eliminating the modulator of FIG. 3;

FIG. 4A is a schematic diagram illustrating a method of injecting the rider signal by modulation of the AVC or AGC voltage to the input R.F. amplifier;

FIGS. 5, 6 and 7 are block diagrams of additional modifications of the present invention.

DETAILED DESCRIPTION OF PREFERRED EMBODIMENTS

Referring to the drawings, and particularly to the block diagram illustrated in FIG. 1, there is shown the typical stages of a conventional aircraft VOR navigational receiver which operates by comparing the relative phase angles of a reference 30 cycle sine wave and a variable 30 cycle sine wave which varies with the position of the receiver. The conventional components of the typical aircraft VOR navigational receiver shown in FIG. 1 include the R.F. amplifier 11, the mixer 12, the conventional I.F. amplifiers and detector indicated generally at 13, the 30 cycle variable amplifier 14, the phase resolver 15, the amplifier 16, the R.F. oscillator 17, the 9,960 cycle filter, amplifier and limiter 18, the 9,960 cycle F.M. detector 19, amplifier 20, 30 cycle and rider filters 21 and 22, flag 23, filter and phase detector bridges 24 and 25, and course and position indicators 26. Added to these typical conventional components are an audio oscillator reference signal generator 27, an amplitude modulator 28, a variable gain audio amplifier 29, a fixed gain audio amplifier 30, a phase resolver 31, amplifiers 32 and 33, filters and null bridges 34 and 35, and a fail-safe warning flag 36. These additional components operate to detect any change in the normal operating characteristics of the receiver and thus provide warning of a receiver failure to the operator. Audio oscillator 27 provides a signal, in this case a sine wave, which is coupled to the amplitude modulator 28 which modulates the output of the R.F. oscillator 17. When a signal is received through the R.F. amplifier 11, and mixed in the mixer 12 with the output of the local oscillator 17, the rider signal produced by the modulation of the R.F. oscillator 17 by the reference signal generator 27 becomes superimposed with the received signal without creating interference signals. This composite signal consisting of the received navigational signal and the test rider signal is then amplified and demodulated in the conventional manner by the circuits 13 and the rider signal appears superimposed on the received signal at the location indicated at B. The 30 cycle variable amplifier 14 will have adequate band width and will amplify both the 30 cycle navigational signal and the rider signal, but will reject the 9,960 cycle F.M. reference signal. The output consisting of both the 30 cycle navigational signal and the rider signal is then coupled to a phase resolver 15 which changes the variable 30 cycle phase signal to balance with the 30 cycle reference signal to be described later. This resolver 15 will subsequently also change the phase of the rider signal. Therefore the other portion of the detector contains a like phase resolver 31 connected to the same course selector C.S.. This results in an equivalent phase change in the reference monitor signal to maintain the balance in the null bridge 34. The reference monitor signal is obtained from the variable gain amplifier 29 which has its gain controlled by the AVC or AGC circuits, and which thus maintains a corresponding level with the output of the rider signal at location B. As a result, the monitor reference signal at location G at the output of amplifier 32 will maintain the same amplitude and be 180° out of phase from the rider signal at location E at the output of amplifier 16. This results in both signals cancelling each other out, which is required to remove the warning flag from view.

The 30 cycle reference channel is monitored by injecting the rider signal into the reference detector 19 and comparing it in the null bridge 35 with the original signal which has been amplified and phase inverted through amplifier 33 so as to be of like amplitude, but 180° out of phase, relative to the rider signal appearing at I at the output of amplifier 20. This results in a balance condition which would be required to remove the warning flag 36 from view.

It will be apparent from the above description of the system that any change in the normal operation of stages 12, 13, 14, 15, 16, 19 or 20 would result in a warning flag appearing at 36, since any change in the operating characteristics of these stages would change the rider signal resulting in a change in the output of the null bridges 34 and 35. To preclude the possible loss of both the rider signal and the monitor reference signal, which would also appear as a balanced condition, occurring for example if the audio oscillator 27 were to fail, the flag 23 would also appear if either the rider or the reference monitor signal or both were to disappear. This is accomplished by a selective filter tuned to the same frequency as the audio oscillator 27 and incorporated as a part of the 30 cycle and rider filter stages 21 and 22 coupled with the flag 23, which removes all other signals other than the rider and causes the flag to appear if the rider disappears.

FIG. 2 shows another version of the failure warning system as applied to an aircraft VOR navigational receiver. In FIG. 2, the circuit components or stages corresponding to stages illustrated in FIG. 1 are indicated by the same reference characters as were employed in FIG. 1. In the FIG. 2 version, the monitor reference system amplifiers 32 and 33 of the FIG. 1 version are eliminated by coupling the output of phase resolver 31 through fixed gain amplifier 30 into the 9,960 cycle F.M. detector 19 and comparing the resultant rider signal outputs in the phase bridges 24 and 25. This is accomplished by using an audio wave which is not harmonically related to the 30 cycle navigational signal, but which is sufficiently close so as to pass along with it in all of the circuits, such for example as using a 49 cycle audio wave. Both rider signals would be 180° out of phase and of like amplitude so that they would cancel and not affect the course selector C.S.. If for some reason the receiver were to fail, then the rider detector bridge 40 which is tuned to the rider signal would give warning of failure. Again, circuits tuned to the rider signals would also monitor for a complete loss of either or both signals which would also give warning of a receiver malfunction.

FIG. 3 shows an arrangement for applying the failure warning system to an aircraft ILS localizer or glide slope receiver. The receiver illustrated in FIG. 3 includes typical conventional stages such as the R.F. amplifier 51, mixer 52, I.F. amplifiers and detector 53, 90 cycle amplifier 54, 90 cycle filter 55, R.F. oscillator 56, 150 cycle amplifier 57, 150 cycle filter 58, course indicator 59, and signal loss flag 60. Added to these conventional typical circuits are an audio oscillator 61 which generates an audio signal having a frequency somewhere between the 90 cycle and 150 cycle navigational signals, but which would not be harmonically related to them, for example about 124 cycles. This 124 cycle audio signal is coupled to the modulator 62 to modulate the R.F. oscillator 56 which results in superimposing of the 24 cycle signal with the received navigational signals. This superimposed rider signal of 124 cycles per second would then pass through the remainder of the receiver and would appear in the 90 cycle filter 55 and the 150 cycle filter 58, where it is extracted and applied to rider error detector null bridges 65 and 66. The monitor reference signal amplitude is controlled in a variable gain amplifier 63 which is controlled by the AVC or AGC circuits, and is applied through the fixed gain amplifier and phase shift network 64 to the rider error detector bridges 65 and 66. Any change in the normal operation of the conventional stages of the receiver, such as the stages 52, 53, 54, 55, 56, 57 or 58, would result in activation of the receiver failure flag 67 and any monitor signal loss will result in activation of the warning monitor signal loss flag 68.

The arrangement shown in FIG. 4 is the same as that illustrated in FIG. 3 except the modulator 62 of FIG. 3 is eliminated. Instead of modulating the R.F. oscillator 56, the output of the audio oscillator 61 amplified by audio amplifier 70 is applied to the R.F. amplifier 51 at a point similar to that where the AVC or AGC are applied, so as not to allow the audio oscillator signal to affect any other stages but to allow the gain of the R.F. amplifier to vary at the audio rate of the audio oscillator 61. This results in the rider signal being superimposed on the incoming signal. A similar procedure can also be applied to the previously described embodiments.

It is important in injecting signals to use only a small amount of signal so as not to distort the required navigational signals to the point of unreliability. For example, if the received signal components total 90 percent of the modulation envelope, it is important not to apply any more rider signal that would increase the modulation envelope to 100 percent.

FIG. 4A is a schematic diagram illustrating one method of injecting the rider signal by modulation of the AVC or AGC voltage to the input of the R.F. amplifier. In this arrangement, the grid of the audio amplifier stage 70 is coupled through a capacitor to the monitor reference oscillator 61 and the plate of the amplifier stage 70 is coupled through a capacitor and a radio frequency choke to the lower end of the input R.F. transformer secondary winding in the grid circuit of the R.F. amplifier stage 51. If no AVC or AGC is applied to the R.F. amplifier, then direct grid, base, gate, cathode, emitter, or source modulation could be used to effect the same principal of injection of the rider signal on the received radio frequency signal.

FIG. 5 illustrates another version similar to that of FIGS. 3 and 4, with the components in FIG. 5 which correspond to those of FIGS. 3 and 4 being indicated by the same reference characters. In the arrangement of FIG. 5, instead of varying the reference channel signal with the strength of the received signal, the rider is varied as the gain of the receiver is decreased. The AVC or AGC voltage is inverted in the phase inverter 71 so as to allow the variable gain audio amplifier 72 to inject a greater signal into the R.F. amplifier 51. The result is that the rider level appearing at the detector 53 remains constant and after passing through the remaining circuits is compared as in the embodiments of FIGS. 3 and 4.

FIG. 6 illustrates an arrangement similar to that of FIG. 5, except that a different method of extracting the rider is used, based on a single rather than dual or separate amplifier systems as is used in most ILS receivers.

FIG. 7 illustrates in block diagram form an arrangement for applying the failure warning system principals to auto pilot servo amplifiers. In this arrangement, the input commands are coupled through the servo amplifiers 101 and 102 to the servo 103 and the rider signal oscillator 104 provides an output signal applied through the amplifier 105 to the servo amplifier 101. The output of the audio oscillator 104 is also applied through amplifier and phase shift network 107 to one side of the rider error detector bridge 108, the other side of which receives signals from the output of servo amplifier 102 through filter and amplifier 106. The equipment failure warning flag is indicated at 109 and the rider signal loss warning flag is indicated at 110. Again, a low level, non-interfering rider is used and is compared with a reference which is processed to represent a like condition in the working channels 101 and 102 and is then compared in the error detector bridge 108 to give warnings by activating the flags 109 or 110, or to be used to automatically disengage the auto pilot by conventional control circuitry.

What is claimed is:

1. In a radio receiver for navigation or guidance of aircraft and the like having conventional alternating current radio signal processing channel means including high frequency processing stages for processing at radio frequencies and intermediate frequencies received navigational or guidance alternating current radio signals to activate a course indicator; the improvement comprising means in the receiver for superimposing rider signals on the alternating current radio signals in at least one of said high frequency processing stages near the signal input portion of the receiver for processing of the rider signals with the received signals through said signal processing channel means, comparing means for comparing the rider signals processed through said channel means with the original form of said rider signals and detecting differences therebetween including small phase and amplitude differences, and alarm indicator means for indicating detected differences in the rider signals compared by said comparing means to signify changes in the operating characteristics of said channel means, rider signal loss indicator means for indicating loss of the rider signal separate from said alarm indicator means.

2. In a radio receiver for navigation or guidance of aircraft and the like having conventional alternating current radio signal processing channel means including high frequency processing stages for processing at radio frequencies and intermediate frequencies received navigational or guidance alternating current radio signals to activate a course indicator; the improvement comprising means in the receiver for superimposing rider signals on the alternating current radio signals in at least one of said high frequency processing stages near the signal input portion of the receiver for processing of the rider signals with the received signals through said signal processing channel means, comparing means for comparing the rider signals processed through said channel means with the original form of said rider signals and detecting differences therebetween including small phase and amplitude differences, and alarm indicator means for indicating detected differences in the rider signals compared by said comparing means to signify changes in the operating characteristics of said channel means, said receiver including a local oscillator, and said means for superimposing siad rider signals including a rider signal oscillator and means for modulating the local oscillator of the receiver by the output of the rider signal oscillator.

3. In a radio receiver for navigation or guidance of aircraft and the like having conventional alternating current radio signal processing channel means including high frequency processing stages for processing at radio frequencies and intermediate frequencies received navigational or guidance alternating current radio signals to activate a course indicator; the improvement comprising means in the receiver for superimposing rider signals on the alternating current radio signals in at least one of said high frequency processing stages near the signal input portion of the receiver for processing of the rider signals with the received signals through said signal processing channel means, comparing means or comparing the rider signals processed through said channel means with the original form of said rider signals and detecting differences therebetween including small phase and amplitude differences, and alarm indicator means for indicating detected differences in the rider signals compared by said comparing means to signify changes in the operating characteristics of said channel means, said receiver including means providing automatic gain control voltage applied to an amplifier in said channel means, and said means for superimposing said rider signals including a rider signal oscillator and means for applying the rider signals to the automatic gain control voltage to modulate the latter by the output of the rider signal oscillator.

4. In a radio receiver as defined in claim 1, said comparing means comprising a null bridge, and said rider signal channel processing the rider signals to cause the reference rider signals to be 180° out of phase and of like amplitude and harmonic content as the rider signals processed through said channel means when the channel means is operating properly.

5. In a radio receiver for navigation or guidance of aircraft and the like having conventional received signal processing channel means for processing the received navigational or guidance radio signals to activate a course indicator; the improvement comprising means in the receiver for superimposing rider signals on the received radio signals near the signal input portion of the receiver for processing of the rider signals with the received signals through said signal processing channel means, comparing means for comparing the rider signals processed through said channel means with the original form of said rider signals to detect differences therebetween, and alarm indicator means for indicating differences in the rider signals compared by said comparing means signifying changes in the operating characteristics of said channel means, said receiver having a local oscillator, and said means for superimposing said rider signals including a rider signal oscillator and means for modulating the local oscillator of the receiver by the output of the rider signal oscillator.

6. In a radio receiver for navigation or guidance of aircraft and the like having conventional received signal processing channel means for processing the received navigational or guidance radio signals to activate a course indicator; the improvement comprising means in the receiver for superimposing rider signals on the received radio signals near the signal input portion of the receiver for processing of the rider signals with the received signals through said signal processing channel means, comparing means for comparing the rider signals processed through said channel means with the original form of said rider signals to detect differences therebetween, and alarm indicator means for indicating differences in the rider signals compared by said comparing means signifying changes in the operating characteristics of said channel means, said receiver having means providing automatic gain control voltage applied to an amplifier in said channel means, and said means for superimposing said rider signals including a rider signal oscillator and means for applying the rider signals to the automatic gain control voltage to modulate the latter by the output of the rider signal oscillator.

7. In a radio receiver for navigation or guidance of aircraft and the like having conventional received signal processing channel means for processing the received navigational or guidance radio signals to activate a course indicator; the improvement comprising means in the receiver for superimposing rider signals on the received radio signals near the signal input portion of the receiver for processing of the rider signals with the received signals through said signal processing channel means, means for separately processing said rider signals through a rider signal channel to produce reference rider signals, comparing means for comparing the rider signals processed through said channel means with the reference rider signals to detect differences therebetween, and alarm indicator means for indicating differences in the rider signals compared by said comparing means signifying changes in the operating characteristics of said channel means, said receiver having a local oscillator, and said means for superimposing said rider signals including a rider signal oscillator and means for modulating the local oscillator of the receiver by the output of the rider signal oscillator.

8. In a radio receiver as defined in claim 7, said improvement including rider signal loss indicator means separate from said alarm indicator means for indicating loss of the reference rider signals.

9. In a radio receiver as defined in claim 7, said comparing means comprising a null bridge, and said rider signal channel processing the rider signals to cause the reference rider signals to be 180° out of phase and of like amplitude and harmonic content as the rider signals processed through said channel means when the channel means is operating properly.

10. In a radio receiver for navigation or guidance of aircraft and the like having conventional received signal processing channel means for processing the received navigational or guidance radio signals to activate a course indicator; the improvement comprising means in the receiver for superimposing rider signals on the received radio signals near the signal input portion of the receiver for processing of the rider signals with the received signals through said signal processing channel means, means for separately processing said rider signals through a rider signal channel to produce reference rider signals, comparing means for comparing the rider signals processed through said channel means with the reference rider signals to detect differences therebetween, and alarm indicator means for indicating differences in the rider signals compared by said comparing means signifying changes in the operating characteristics of said channel means, said receiver having means providing automatic gain control voltage applied to an amplifier in said channel means, and said means for superimposing said rider signals including a rider signal oscillator and means for applying the rider signals to the automatic gain control voltage to modulate the latter by the output of the rider signal oscillator.

11. In a radio receiver as defined in claim 10, said improvement including rider signal loss indicator means separate from said alarm indicator means for indicating loss of the reference rider signals.

12. In a radio receiver as defined in claim 10, said comparing means comprising a null bridge, and said rider signal channel processing the rider signals to cause the reference rider signals to be 180° out of phase and of like amplitude and harmonic content as the rider signals processed through said channel means when the channel means is operating properly.

* * * * *

UNITED STATES PATENT OFFICE
CERTIFICATE OF CORRECTION

Patent No. 3,820,115        Dated June 25, 1974

Inventor(s) NEIL STONE

It is certified that error appears in the above-identified patent and that said Letters Patent are hereby corrected as shown below:

Column 4, line 16, "24 cycle" should read --124 cycle--;

Column 6, line 19, "siad" should read --said--.

Signed and sealed this 29th day of October 1974.

(SEAL)
Attest:

McCOY M. GIBSON JR.         C. MARSHALL DANN
Attesting Officer        Commissioner of Patents